Oct. 15, 1935.  A. J. RE  2,017,472
STAND MIRROR
Filed June 12, 1934
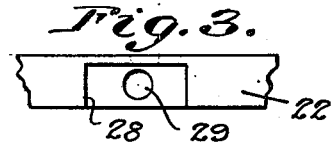
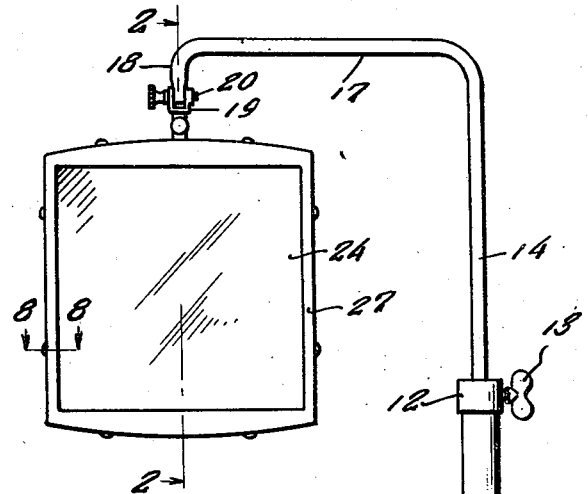
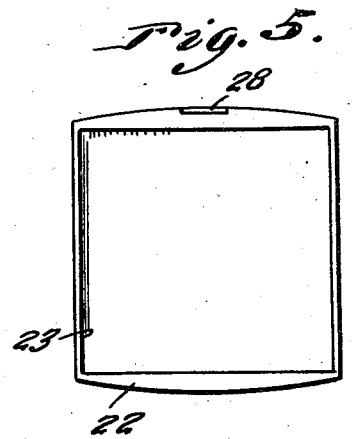
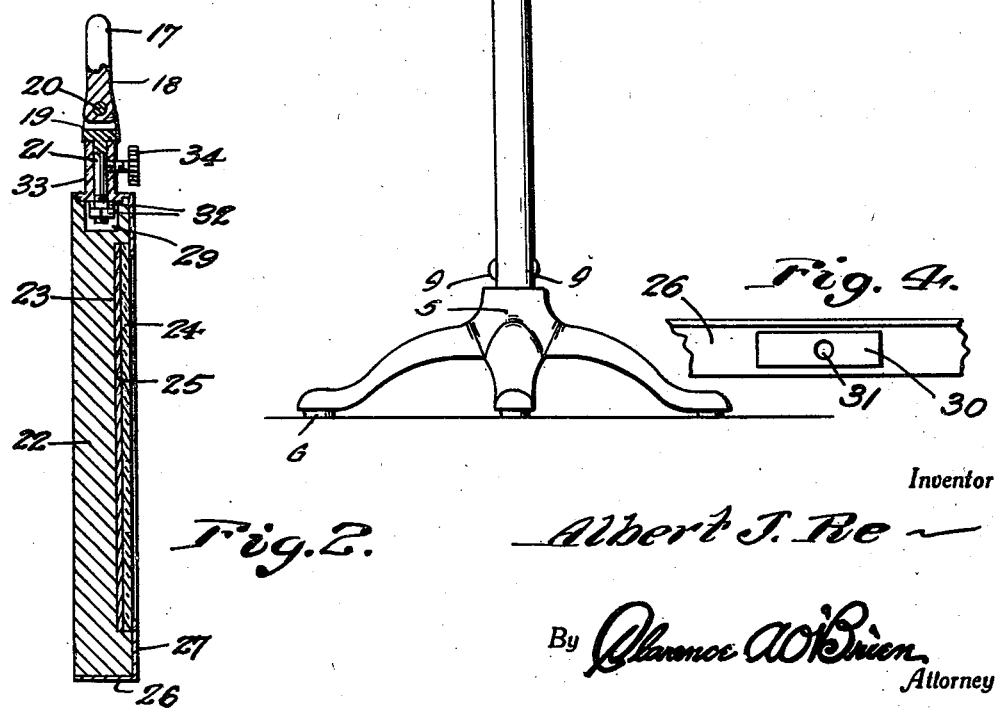
Inventor
Albert J. Re
By Clarence A. O'Brien
Attorney Patented Oct. 15, 1935

2,017,472

UNITED STATES PATENT OFFICE 2,017,472

STAND MIRROR

Albert J. Re, Wilmington, Del., assignor of forty-nine per cent to Clarke F. Reynolds, Wilmington, Del.

Application June 12, 1934, Serial No. 730,337

1 Claim. (Cl. 88—97)

This invention appertains to new and useful improvements in mirrors and more particularly to a mirror which can be readily adjusted to various positions for the accommodation of its user. It is the purpose of this invention principally to provide a mirror for persons confined to beds to the end that the sick person can view herself from time to time, while in the case of a man, to permit him to shave conveniently without necessitating the assistance of some one to hold a mirror.

Therefore the principal object of the invention is to provide a stand mirror which is particularly adapted for use by sick persons in bed wherein the mirror is mounted in such a manner as to be convenient and not interfere with the free movement of the person using the mirror.

Another important object of the invention is to provide a stand type mirror wherein the parts can be replaced easily and conveniently in the event damage occurs.

A further important object of the invention is to provide a mirror which can be conveniently adjusted to meet varying demands.

Other important objects and advantages of the invention will become apparent to the reader of the following specification.

In the drawing:

Figure 1 represents a side elevational view of the novel stand mirror.

Figure 2 represents an enlarged vertical sectional view taken substantially on line 2—2 of Figure 1.

Figure 3 represents a fragmentary top plan view of the mirror back removed from the frame.

Figure 4 represents a fragmentary side elevational view of the upper portion of the frame.

Figure 5 represents a front elevational view of the mirror back removed from the frame.

Referring to the drawing wherein like numerals designate like parts, it can be seen in Figure 1 that numeral 5 denotes a base of the radial leg type having cushioning pads 6 on the toe portions thereof. Set screws 9 are disposed through the lower portion of the upright 8 and hold the upright to the base. The sleeve 12 and the upper end portion of the upright 8 are provided with registering openings through which the set screw 13 can be disposed to bite against the post 14 which is slidably received in the hollow upright 8.

It will be observed, that by disposing the set screw 13 through the sleeve 12 and upright 8 to bite against the post 14, all of these parts will be firmly secured together and by the simple removal of this set screw these parts can be conveniently disassembled.

The upper end of the post 14 is provided with a laterally disposed arm 17 and a depending end portion 18. This depending end portion 18 is slightly reduced and engages into a U-shaped member 19. A set screw 20 is disposed through this U-shaped member 19 and through the reduced depending end portion 18 and in this manner the U-shaped member 19 is swingably connected to the arm 17. As is clearly shown in Figure 2, the U-shaped member 19 is provided with a depending spindle 21.

As is clearly shown in the drawing the mirror unit consists of a back 22 which will preferably be made of wood and provided on its front face with a depression 23 into which the mirrored glass 24 can be set against a cushion backing 25. A frame 26, of a size to conform with the contour of the back 22 is employed and has a front flange 27 which overlaps a portion of the edge of the glass sheet 24.

By examining Figures 2 and 3, it can be seen that the upper portion of the back 22 is provided with an impression 28 and in the bottom of this is located a recess 29. The upper portion of the frame 26 is provided with a depending square shaped boss 30 which fits into the impression 28. The upper portion of the frame 26 has an opening 31 which extends through the boss 30 and receives the aforementioned spindle 21. The spindle projects into the recess 29 of the back 22 and is provided with a jamb nut 32. The portion of the frame 26 at the boss is provided with an upstanding sleeve 33 through which the shank 21 extends and a set screw 34 is feedable through the sleeve 33 to bite against the spindle 21. This particular organization of elements forms a swivel connection between the mirror unit and the arm 17, the screw 20 acting as a pivot so that the mirror unit may be swung on a vertical plane while on the spindle 21 the mirror can be rotated on a horizontal plane.

Obviously in the use of the assembly, the same will be pulled close to the bedside and the post 14 will be elevated to the proper height so that the mirror unit when swung over the bed will be within convenient reach of the user. The person using the mirror can use the mirror unit free and adjust the same to whatever particular position most convenient for use and in this position the mirror can be locked by the use of a set screw 32 and the screw 20.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:

A mirror comprising a base, an upright, a rod adjustably telescoping the upright and provided with a laterally disposed arm at its upper end, said arm at its outer end being provided with a depending member, a mirror including a frame, a tubular member extending upwardly from the top of the frame, a yoke, a pin disposed through the leg portions of the yoke and through the depending member on the arm to pivotally connect the yoke to the arm, a shank depending from the yoke and through the tubular member on the frame, the upper portion of the frame being provided with a pocket adjacent the said tubular member for receiving the lower end of the shank, and stop means on the lower portion of the shank to prevent the said shank from being pulled through the tubular member, and means on the said tubular member for retaining the tubular member and frame in a rotatably adjusted position on the shank.

ALBERT J. RE.